United States Patent [19]

Ocker et al.

[11] Patent Number: 4,877,390

[45] Date of Patent: Oct. 31, 1989

[54] DEGASSIFICATION DEVICE FOR A SCREW EXTRUDER WHICH PROCESSES PLASTIC MATERIAL

[75] Inventors: Herbert Ocker, Leonberg; Gerhard Weihrich, Illingen, both of Fed. Rep. of Germany

[73] Assignee: Werner & Pfleiderer GmbH, Stuttgart, Fed. Rep. of Germany

[21] Appl. No.: 176,703

[22] Filed: Apr. 1, 1988

[30] Foreign Application Priority Data

Apr. 3, 1987 [DE] Fed. Rep. of Germany ....... 3711328

[51] Int. Cl.⁴ .............................................. B29C 47/76
[52] U.S. Cl. .................................... 425/203; 222/412; 222/413; 366/84; 366/318; 425/208
[58] Field of Search ............... 425/203, 204, 205, 462, 425/208; 366/75, 85, 318, 320, 88, 89, 83, 84, 91; 264/349; 222/412, 413

[56] References Cited

U.S. PATENT DOCUMENTS

| | | | |
|---|---|---|---|
| 3,525,124 | 8/1968 | Ocker | 425/462 |
| 4,077,753 | 3/1978 | Tanaka | 425/462 |
| 4,107,787 | 8/1978 | Ocker | 366/75 |
| 4,212,543 | 7/1980 | Bersano | 366/85 |

FOREIGN PATENT DOCUMENTS

| | | |
|---|---|---|
| 0114999 | 8/1984 | European Pat. Off. . |
| 915689 | 10/1954 | Fed. Rep. of Germany . |
| 2129839 | 12/1972 | Fed. Rep. of Germany . |
| 3417316 | 11/1985 | Fed. Rep. of Germany . |
| 2442014 | 6/1980 | France . |
| 51-23987 | 7/1976 | Japan . |
| 1167850 | 10/1969 | United Kingdom . |
| 1536542 | 12/1978 | United Kingdom . |

*Primary Examiner*—Jay H. Woo
*Assistant Examiner*—K. P. Nguyen
*Attorney, Agent, or Firm*—Roberts, Spiecens & Cohen

[57] ABSTRACT

A degassification device for a screw extruder which processes plastic material in which the extruder has a hollow housing and an extruder screw rotatable in the housing, the degassification device having a pair of degassification screws disposed adjacent to the extruder screw for rotation about axes parallel to the axes of rotation of the extruder screw. A housing headpiece accommodates the degassification screws and is in communication with the extruder housing such that gas and vapor produced in the extruder housing can flow radially therefrom into the housing headpiece for discharge therefrom. The degassification screws have threads which interengage one another and they are driven in the same direction of rotation. The housing headpiece has adjacent longitudinal bores which overlap one another and respectively receive the degassification screws therein with their threads interengaged with one another. The crests of the threads of the degassification screws pass in close proximity to the inner surface of the housing headpiece and the extruder screw. The length and cross sectional profile of the degassification screws are such that upon rotation of the screws, the overlapped bores in the housing headpiece are longitudinally and transversely traversed by the screws substantially in entirety.

14 Claims, 6 Drawing Sheets

DEGASSIFICATION DEVICE FOR A SCREW EXTRUDER WHICH PROCESSES PLASTIC MATERIAL

FIELD OF THE INVENTION

The present invention relates to a degassification device for a screw extruder for the processing of plastics.

BACKGROUND AND PRIOR ART

In the processing of plastics, it is frequently necessary to remove relatively large quantities of gases or vapors, such as solvents, water and monomers from the material in the course of processing by the screw extruder. However, a limit is placed on the cross section and size of degassification channels in the screw extruder because of the inherent danger that turbulence in the emerging gas or vapor will entrain particles therein of the molten material being processed. Furthermore, this complicates the effective shaping of the extruder screws in the degassification region along the process path of the extruder including shearing and kneading elements thereof as well as the conveyor elements.

A degassing device for plastic processing screw extruders is known from FRG patent DE-PS No. 1554866 in which rollers are arranged in pairs parallel to one another in a degassification opening for returning plastic compositions escaping from the screw extruder. The rollers are opposite each other and form a roll nip therebetween and are rotatable in the direction of the degassification opening, the rollers being optionally provided with a fluted or profiled surface. By virtue of the relatively long degassing path along the extruder, considerable quantities of plastic particles pass through the free cross section of the roller nip which is necessary for degassification. The plastic particles collect on a headpiece of the housing and form solid residues which adhere to the gas discharge line. Such residues change in their physical structure and easily detach themselves and return into the processing material which leads to a reduction in quality.

Another degassification device for a screw extruder is known from European Patent EP-OS No. 01 14 999 in which a return device is arranged in the degassification channel parallel to the axis thereof, the return device being in the form of a conveyor screw extending throughout the cross section of the degassification channel and in communication with the screw chamber of the extruder. The cross section of the degassification channel is thereby limited to the cross section of the screw chamber of the extruder and does not permit the removal of gas and vapor in any amounts as great as desired and hence this device is only adapted to the processing of special products.

Another arrangement of two conveyor screws is shown in FRG patent DE-PS No. 915689 in which the two screws mesh with one another and strip each other in the degassification channel, the arrangement extending perpendicular to the extruder. The cross section of the arrangement is structurally limited. Namely, the diameter of the conveyor screws in the degassification channel is, at most, equal to the diameter of the extruder screw. Hence, with two conveyor screws which strip each other, the active length along the extruder screw for degassification corresponds, at most, to the axial spacing between the conveyor screws plus their diameters.

SUMMARY OF THE INVENTION

An object of the invention is to provide degassification device for a screw extruder with a degassification channel of large cross section and of practically unlimited shape which effectively prevents residues from forming in the degassification channel from particles of plastic which are entrained from the material being processed.

In accordance with the invention, a pair of degassification screws are disposed adjacent to the extruder screw for rotation about axes parallel to the axis of rotation of the extruder screw and the degassification screws are accomodated in a housing headpiece which has an opening in communication with an opening in the extruder housing so that gas and vapor produced in the extruder housing can flow radially therefrom into the housing headpiece. The housing headpiece has an outlet for the discharge of gas and vapor. The degassification screws have threads which interengage one another and the degassification/screws are driven in the same direction of rotation. The housing headpiece is formed with overlapped longitudinal bores respectively receiving the degassification screws therein with their threads interengaged with one another. The threads have outer peripheral surfaces which confront, in close proximity, the inner surface of the housing headpiece and the degassification screws are of a length and cross-sectional profile so that upon rotation of the screws, the overlapped bores in the housing headpiece are longitudinally and transversely traversed by said screws substantially in entirety.

The degassification device in accordance with the invention is not limited in its width or length and the cross section of the degassification channel can be made as large as desired whereby a uniform mass transfer can be effected even at high speeds of discharge of the stream of gas or vapor. This permits use of the extruder for treatment of difficult substances such as sticky pastes and products.

The degassification screws whose threads engage one another and are driven in the same direction effectively remove gas and/or vapor over a relativey short path since they are traversed transversely without major deflection of the stream of gas or vapor and any entrained particles of the processed produce are reliably intercepted. As a result of the stripping action of the degassification screws, the particles of product are continuously returned in positive manner into the stream of product in the extruder.

In the case of products of relatively low viscosity and accordingly intense heat transfer upon processing in the screw extruder, the freely determined cross section of the discharge passage in the degassification device permits an unimpeded removal of large quantities of gas and vapor. The particles of product hurled out of the degassification zone of the extruder in the course of formation of bubbles or foam from the product mass are scraped off the degassification screws along the screw crests and from the inner wall of the headpiece of the housing by the degassification screws and returned to the product stream in the extruder. In the case of a high product concentration, with which relatively small quantities of gas and vapor are to be discharged by a diffusion which takes place essentially by mass transfer, the degassification device also makes possible a return of viscoplastic particles which settle out.

Although known degassification devices utilize screw elements in the region of the degassification zone, it is possible with the degassification device in accordance with the present invention to be employed in combination with mixing and shearing elements, or such elements in combination with kneading discs, in the degassification zone. Since the extruder screw and the degassification screws influence each other with respect to the exchange of material, other degassification regions formed along the screw extruder can also be easily adapted to the properties of the product which vary during the entire course of the processing.

In accordance with features of the invention, special structural shapes of the degassification device are made which permit adoption of the degassification cross section to different stages of the processing of the product mass.

According to further features, embodiments are developed which are limited with respect to space and processing.

In a preferred embodiment, the degassification screws are of the same diameter as the extruder screw and have a lead angle and direction of rotation to convey material in the same direction as the extruder screw. Thereby, a large reception area is produced for separated particles and return of the particles is effected into the already concentrated stream of product at the downstream end of the degassification zone.

The return can be promoted by forming a section at the downstream end of the degassification screws of opposite lead angle to assure intensive reintroduction of the product for highly viscous products in order to increase their homogeneity. In this way, the reintroduction of the product into the extruder is improved.

In another embodiment of the degassification screws, they are formed as spiral threads without a shaft and preferably with an open central passage to increase the free cross section in the degassification channel.

BRIEF DESCRIPTION OF THE FIGURES OF THE DRAWING

FIGS. 6a–9a are diagrammatic sectional views of further embodiments of degassification screws, and FIGS. 6b–9b are respective longitudinal views of the screws.

DETAILED DESCRIPTION OF PREFERRED EMBODIMENTS

Figure 1:
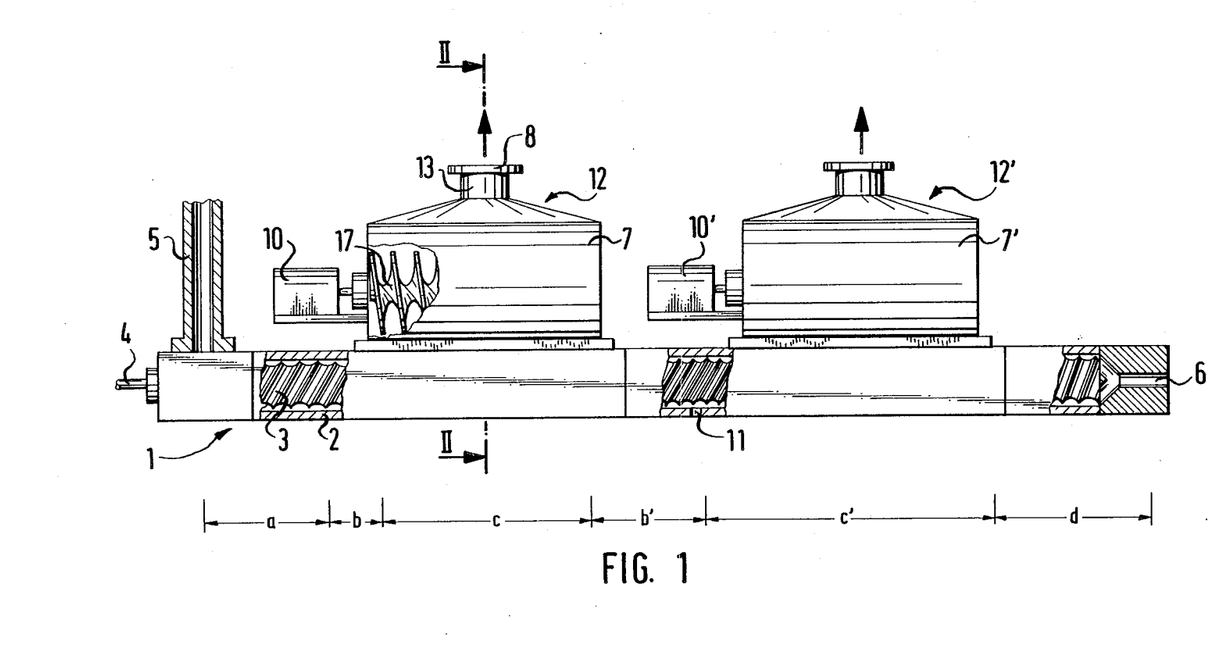
FIG. 1 is a side elevational view, partly broken away and in section, of a screw extruder with two degassification devices according to the invention.

A screw extruder 1 is shown in FIG. 1 and consists of a hollow cylindrical housing 2 in which an extruder screw 3 is contained. There can be more than one screw 3 in housing 2 as will be seen later. The screw 3 is driven by a drive unit (not shown) which is connected to a drive shaft 4 of the screw 3. An inlet pipe 5 is connected to the housing 2 at its upstream end relative to the direction of conveyance of material by the screw 3 for the supply to the extruder of plastic material to be processed in the extruder. At the downstream end of the screw extruder 1 is an outlet nozzle 6 or granulating device (not shown) for the discharge of finished product.

The starting material supplied to pipe 5 can be in the form of a solution (polymer and solvent), a paste or a suspension. Arranged along the screw extruder 1 are a plurality of processing zones, such as, for instance, a conveyor zone a, compression and pressure reduction zones b, c and b', c', respectively, and an extrusion zone d. The different zones are established, in known fashion, by the manner of the construction of the screw 3, i.e. length, pitch and arrangement of shearing and kneading elements. When in the compression zones b, b', the starting material which is supplied by the pipe 5 and fed through the conveyor zone a undergoes compression and the material is then transported in the subsequent pressure-reduction zones c, c' in pressureless condition or under vacuum to remove, in these zones, volatile components present in the starting material such as water vapor, solvent and the like. For this purpose, the housing 2 is provided with at least one degassification device 12.

The degassification device 12 has a radial degassification channel 13 formed in a housing 7 through which volatile components of the starting material are discharged in the direction of the arrow in FIG. 1. The discharge can be effected under vacuum by means of a vacuum pump (not shown). At the upper end of the housing 7 there is formed an outlet 8 which may be connected to the vacuum pump.

As shown in FIG. 1, the screw extruder has two degassification devices 12, 12', each with a respective housing headpiece 7, 7'. Depending on the requirements and the purpose of the finished product, only one or more than two degassification devices 12, 12' can be provided along the process path of the screw extruder 1. In order to improve the quality of the final product, an entrainment agent can be added, for instance water, which promotes the expulsion of the volatile substance. For this purpose there is provided in front of the last degassification device 12' present in the direction of conveyance of the product, a feed opening 11 in the housing 2 of the screw extruder 1.

As described in further detail below with reference to FIG. 2, each of the degassification devices 12, 12' is provided with degassification screws 17, 17' engaging each other in the housing headpiece 7, 7'. The degassification screws 17, 17' in devices 12, 12' are driven in the same direction of rotation by respective drive units 10 and 10' including a drive motor and associated gearing. The screws 17, 17' engage with one another in that the screws are laterally spaced so that the threads or flights of the adjacent screws interfit in one another in a meshed fashion.

Figure 2:
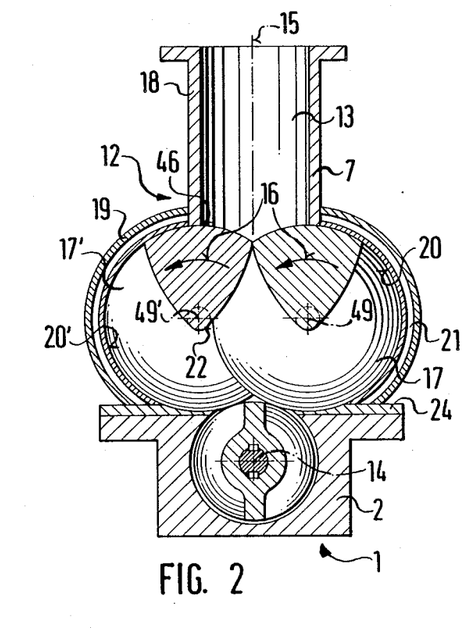
FIG. 2 is a sectional view through one of the degassification devices along line II—II in FIG. 1.
Figure 2A:
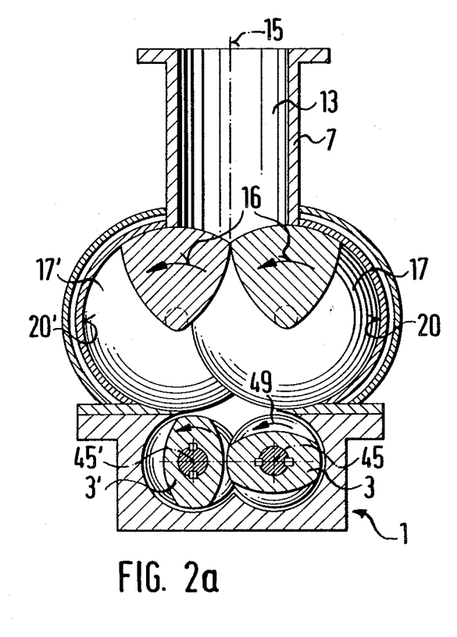
FIG. 2a shows a sectional view through one of the degassification devices of FIG. 2 with a double shaft screw extruder
Figure 3:
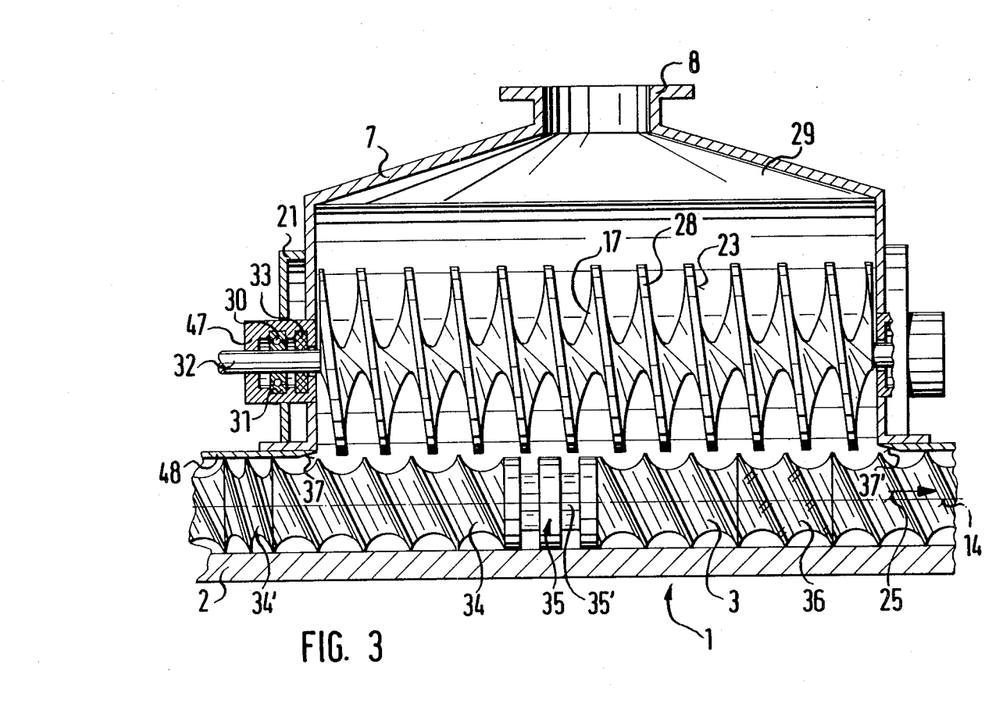
FIG. 3 is a longitudinal sectional view through the degassification device of FIG. 2.

In an embodiment shown in further detail in FIGS. 2 and 3, the longitudinal axis 15 of channel 13 is arranged radially with respect to the longitudinal axis 14 of the screw 3 of the screw extruder 1 and intersects the same. In the housing headpiece 7, two longitudinal bores 20, 20' are formed which overlap one another and whose longitudinal axes 49, 49' lie in a plane which is horizontal and parallel to the longitudinal axis 14 (FIG. 2) and 45, 45' (FIG. 2a) respectively of the extruder. The longitudinal bores 20, 20' overlap one another by an amount equal to the radius of one of the bores.

In the longitudinal bores 20, 20' are respectively arranged the two degassification screws 17, 17' whose threads are interengaged and mesh with one another. The screws 17, 17' are driven in the same direction as indicated by arrows 16. The outside diameter of the screws is such that the screws have very slight clearance in the longitudinal bores 20 and 20' in the housing headpiece 7 as well as with one another at their central shafts 22 such that the screws effect a scraping action on the walls of the housing 7 and on one another. For this purpose, the housing headpiece 7 is formed of an upper part 18 and a lower oval part 19 which partially surrounds the degassification screws 17, 17'. The arrangement is such that the periphery 46 of the threads of the degassification screws 17, 17' extends with slight clearance, at the lowest ends in the screw 3 of the screw extruder 1 and elsewhere with slight clearance in the longitudinal bores 20, 20' of the oval part 19. In order to convey the gas or vapor streams to the outlet 8, the upper part 18 of the housing headpiece 7 includes a conically tapered wall 29 joining the lower part of the housing 7 to the outlet 8. In particular, the lower end of housing headpiece 7 is rectangular in outline and wall 29 connects the rectangular outline of the housing to the outlet 8 which is cylindrical. In order to effect heating of the housing headpiece 7, the housing headpiece 7 has a heating chamber 21 in oval part 19 for flow of a heating fluid. The housing headpiece 7 is provided with an open mounting plate 24 for attachment to the housing 2 of the screw extruder 1.

As further shown in FIG. 3, the threads 23 of the degassification screws 17, 1' have a itch direction or hand which, in combination with their direction of rotation (arrow 16), corresponds to a direction of conveyance (arrow 25) of the screw 3 of the screw extruder 1. In this way, any plastic particles which are intercepted in the degassification device 12 are positively fed, by means of the degassification screws 17, 17' which scrape plastic particles off one another, downstream of the processing material in the screw extruder 1.

Since the cross section for the otflow of gas from the degassification device 12 is traversed only by the crest of threads 28 of the degassification screws, an open cross sectional area of substantially 95% is obtained. In this way a tranquil mass transfer is obtained over a large cross sectional area so that the dange of entrainment of particles by turbulence from the product stream is considerably minimized.

The degassification screws 17, 17' are traversed transversely over a relatively short path by the gas or vapor stream so that the gas or vapor stream can be discharged with relatively low flow velocities.

As can be furthermore noted from FIG. 3, the degassification screws 17, 17' are rotatably mounted in bearings 30 arranged in the housing headpiece 7, the bearings 30 being isolated by sealing rings 33 from vacuum pressures prevailing in the region of the bore 31 for the drive shaft 30. The bearings 32 are supported in a bearing housing 47.

The threads of screw 3 of the screw extruder 1 are shaped, in the region where the degassification screws 17, 17' are tangent to it, as a function of the product to be conveyed by the screws. Since the degassification screws 17, 17' permit a positive continuous return of the product and thus an intensive exchange of material, an assembly 35 of individual kneading element 35' as well as shearing elements 36 can be provided in addition to individual screw elements 34, 34'. Their use and arrangement is a function of the product and provides development of shearing and kneading forces. An inner shell 48 of the extruder housing 2 is provided at the entrance and exit regions thereof for the supply and discharge of the product to and from the degassification zone. The shell 48 is formed with respective bevels 37 and 37' to promote degassification and flow of the product.

In FIG. 2a the same degassification device as in FIGS. 2 and 3 is shown, with the difference that the screw extruder 1 is provided with two interengaging screws 3 and 3'. The longitudinal axis 15 of the degassification channel 13 is in this case arranged radially with respect to the central axis of the two axes 45 and 45' of the screws 3, 3'. The two screws 3, 3' can be driven in opposite directions or in the same direction. In the embodiment shown, the two screws 3, 3' are driven in the same direction, namely in the direction indicated by the arrows 49, and scrape each other along a three-dimensional curve. The degassification screws 17, 17' are driven, as in FIG. 2, in the direction of the arrows 16, thereby scraping against each other as well as against the inner wall of the housing headpiece 7 with slight clearance.

Figure 4:
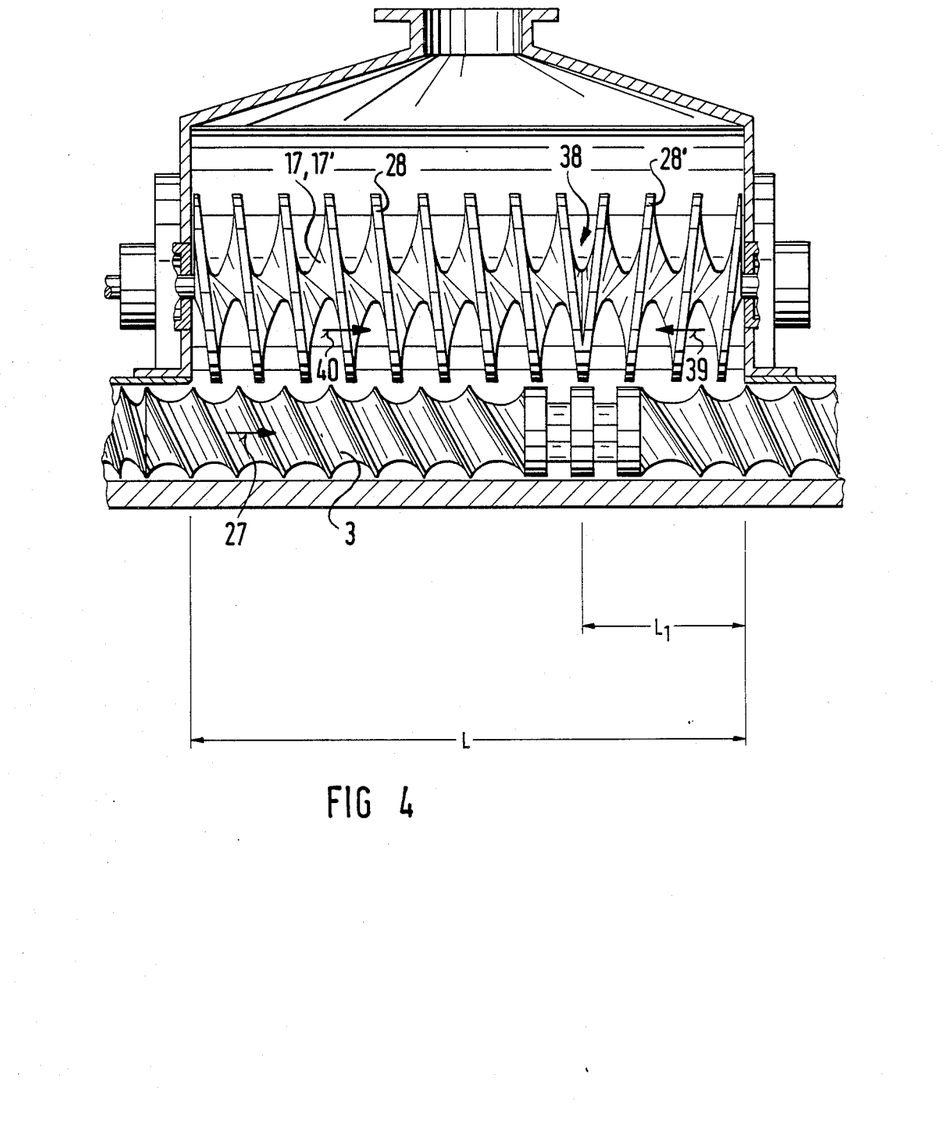
FIG. 4 is a longitudinal section through another embodiment of the degassification device according to the invention.

In FIG. 4 there is shown an embodiment of the two degassification screws 17, 17' (corresponding to FIGS. 2 and 2a respectively) with a different direction of thread lead. The thread lead is so developed in accordance herewith that in a first region the threads 28 of the screws effect a product transport 40 in the direction of conveyance 27 of the screw 3 while in a second, downstream region the threads 28' are reversed and provide a product transport 39 which is opposite the conveyance direction 27 of the screw 3. In the mating region 38 of the threads 28, 28', the product is pulled in strongly. In this way there takes place, still within the degassificatioh zone, a rearranging by the processing screw 3 of the particles removed from the product together with the stream of gas or vapor. This is advantageous, particularly in the case of highly viscous products, in order to improve their homogeneity. The length L1 of the opposing lead corresponds at most to one-half the length L of the degassification screws 17, 17'

There is preferably provided in the mating region 38 a kneading block 35, constituted in khown manner, of individual successive lenticular kneading discs 35'. The discs 35' interrupt the flow of material within the processing screw 3 and provide new surfaces of material for the degassification process.

Figure 5:
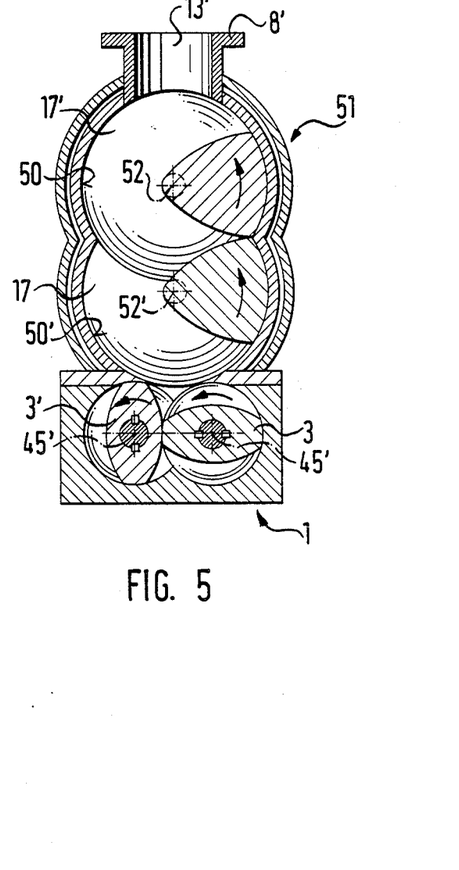
FIG. 5 shows a modification of the degassification device in FIG. 2 with vertically arranged degassification screws.

The degassification screws 17, 17' can, instead of the horizontal arrangement shown in FIGS. 2 and 2a, be arranged vertically one above the other, in a housing headpiece 51 as shown in FIG. 5. Although degassification screws which lie horizontally adjacent to each other (FIGS. 2, 2a) serve to create larger degassification surfaces in the case of readily foaming products, the degassification screws 17, 17' of FIG. 5 which lie vertically above one another reliably intercept individual particles entrained during the gassification over a long vapor removal path, particularly in the concentrating of sticky rubber solutions. For this purpose, two overlapped longitudinal bbres 50, 50' are formed in housing 51 and the longitudinal axes 52, 52' of the bores lie in a plane which is perpendicular to the plane containing longitudinal axes 45, 45' and midway therebetween. The degassification screws 17, 17' also scrape against each other and against the longitudinal bores.50, 50' of the housing 51 with slight clearance. The degassification screws 17, 17' also extend with slight clearance up to the screws 3, 3' of the screw extruder 1. The exit of the stream of gas or vapor takes place through the degassification channel 13' to the outlet 8' which forms a one-piece unit integrally with the housing 51.

In another modification (not shown in detail) of the embodiment in FIG. 5, the upper degassification screw 17' which meshes with the lower degassification screw 17 and together with the latter scrapes the inner wall 20 of the housing headpiece 49, has a smaller outside diameter than the lower degassification screw 17 whereby the upper part of the housing is then adapted in size to the diameter of the upper degassification screw 17.

Further modifications of the degassification screws are shown on FIGS. 6a–9a and 6b–9b.

Figure 6A:
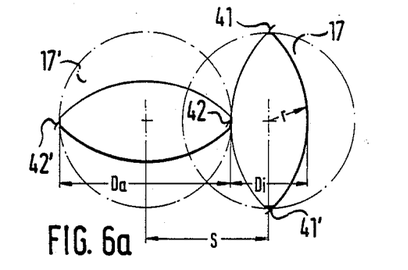
Figure 6B:
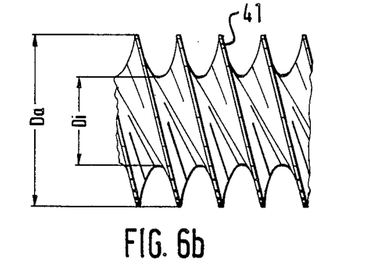

FIGS. 6a and 6b show an embodiment of interengaging and mutually scraping degassification screws 17, 17' having a double/flank screw profile. Namely, as seen in the cross section of each of these screws, two profiled theads form crests 41, 41', 42, 42'. With this known geometry of the shape of the screw, the ratio of the radius r of the screws to the axial spacing s of their shafts is such as to assure a sealing, and thus self-cleaning of the two screws which are adjacent to each other in a plane. The ratio of the two outside diamemters Da to Di of the screws is equal to or greater than 2.2.

Figure 7A:
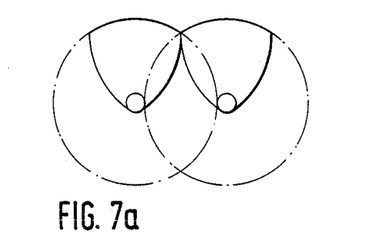
Figure 7B:
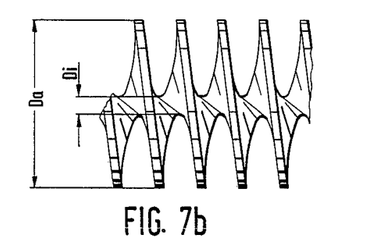

FIGS. 7a and 7b show a single flight embodiment of the screws whose ratio of the diameters Da to Di is about 10.

In order to obtain the greatest possible free degassification cross section, it may be advantageous to form the degassification screws without a core or shaft whereby the screw is constituted by a spiral thread.

Figure 8A:
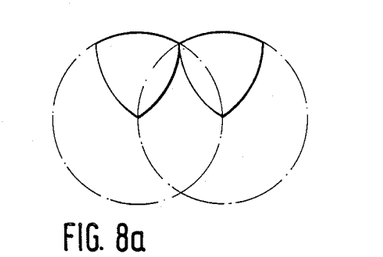
Figure 8B:
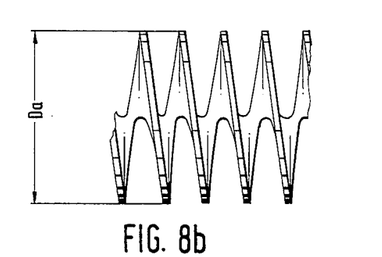

An example of this is shown in FIGS. 8a and 8b wherein the inside diameter Di is equal to zero.

Figure 9A:
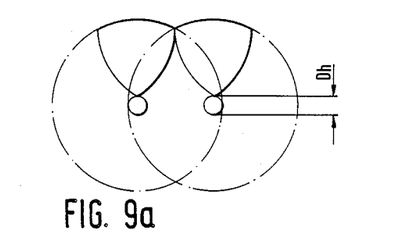
Figure 9B:
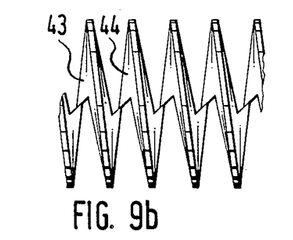

In a further development shown in FIGS. 9a and 9b, the degassification screws are formed solely from a continuous spiral winding 43, the threads 44 of which are traversed by a hollow cylindrical passage of outside diameter Dh. In this embodiment, the core diameter of the degassification screws is less than or equal to zero.

The operation of the degassification device of the invention is given hereafter with reference to a particular example.

For the production of a solvent-free styrene-butadienestyrene copolymer (S-B-S copolymer), a rubber solution consisting of 60 parts by weight of S-B-S copolymer and 40 parts by weight of toluene was fed to a double-flank screw extruder continuously at a temperature of 150° C. The screws of the extruder engage in one another and turn in the same direction with a speed of rotation of 165 rpm. The screws have a diameter of 89 mm and an L/D ratio (length to diameter) of 37. The heat of evaporation necessary for the evaporation of the solvent was obtained by heating the housing of the screw extruded with oil at a temperature of 150°–180° C., and by the drive energy dissipated in the rubber solution.

The concentration of the rubber solution was brought in three stages to a residual solvent content of <0.1%, the first–two degassification stages being formed with degassification screws having an outside diameter of 160 mm and a ratio of the outside diameter to the inside diameter, Da/Di of 10. The speed of rotation of the degassification screws was 18 to 20 rpm and a pressure of 600 mbar was maintained in the first stage and a pressure of 30 to 50 mbar in the second stage. The produce was held in the screw extruder despite strong formation of bubbles and gas removal took place without the slightest expulsion of product particles.

The last degassification stage can be operated with reduced filling of the screw with product and without degassification screws since, as a result of the two previous degassification stages, the tackiness of the product has been considerably reduced. The last degassification stage was therefore developed in the customary manner merely as a degassification opening in the extruder housing which was subjected to a vacuum. The copolymer freed of the solvent was finally granulated at a temperature of 180° C. and a pressure of 60 bar with a throughput of 240 kg/h.

Although the invention has been described in relation to specific embodiments thereof, it will become apparent to those skilled in the art that numerous modifications and variations can be made within the scope and spirit of the invention as defined in the attached claims.

What is claimed is:

1. A degassification device for a screw extruder which processes plastic material, the extruder having a hollow housing and an extruder screw rotatable in the housing, said degassification device comprising a pair of degassification screws disposed adjacent to said extruder screw for rotation about axes parallel to the axis of rotation of the extruder screw, a housing headpiece accommodating said degassification screws and having an opening in comunication with an opening provided in the extruder housing such that gas and vapor produced in the extruder housing can flow radially therefrom into the housing headpiece, said housing headpiece having an outlet for discharge of said gas and vapor, said degassification screws having threads which interengage one another, means for driving the degassification screws in the same direction of rotation, said housing headpiece having adjacent longitudinal bores which overlap one another and respectively receive said degassification screws therein with their threads interengaged with one another, said threads having outer peripheral surfaces which confront, in close proximity, the inner surface of the housing headpiece around the overlapped bores, said degassification screws each comprising a spiral thread without a shaft having a length and cross sectonal profile such that upon rotation of the screws, the overlapped bores in the housing headpiece are longitudinally and transversely traversed by said screws substantially in entirety, the outer peripheral surfaces of the threads of the degassification screws being radially spaced from the outer peripheral surface of the extruder screw such that the threads of the degassification screw do not intermesh with the threads of the extruder screw.

2. A device as claimed in claim 1 wherein said housing headpiece has a longitudinal length and said degassification screws extend substantailly the entire longitudinal length of the housing headpiece.

3. A device as claimed in claim 1 wherein said degassification screws are disposed in adjacent horizontal relation with their axes in a common horizontal plane.

4. A device as claimed in claim 1 wherein said degassification screws are disposed one above the other in vertical relation with their axes in a common vertical plane.

5. A device as claimed in claim 4 wherein the upper one of the degassification screws has a smaller diameter than the other of the screws.

6. A device as claimed in claim 1 wherein said threads of the degassification screws are positioned so that their peripheral surfaces scrape one another, as said screws rotate, along three dimensional curved surfaces.

7. A device as claimed in claim 6 wherein said driving means drives said screws in rotation at a speed of 5 to 50 rpm.

8. A device as claimed in claim 1 wherein the degassification screws each has an outside diameter at least as great as the outside diameter of the extruder screw.

9. A device as claimed in claim 1 wherein said degassification screws each has a lead angle of the threads thereof and a direction of rotation to provide a direction of conveyance which corresponds to the direction of conveyance of said extruder screw.

10. A device as claimed in claim 9 wherein said degassification screws each includes a downstream portion having a lead angle to provide an opposite direction of conveyance from that of the rest of the degassification screw and that of the extruder screw.

11. A device as claimed in claim 1 wherein said degassification screws each comprises a spiral thread without a shaft.

12. A device as claimed in claim 1 wherein said spiral thread defines an open central passage.

13. A device as claimed in claim 1 wherein said bores are cylindrical and the degree of overlap of the bores is substantially equal to the radius of one of the bores.

14. A device as claimed in claim 1 wherein said degassification screws rotate in the same direction as said extrusion screw.

* * * * *